(12) United States Patent
Herzog

(10) Patent No.: US 11,535,289 B2
(45) Date of Patent: Dec. 27, 2022

(54) MOBILIZED MAINTENANCE UTILITY CART

(71) Applicant: Larry D Herzog, Danbury, CT (US)

(72) Inventor: Larry D Herzog, Danbury, CT (US)

( * ) Notice: Subject to any disclaimer, the term of this patent is extended or adjusted under 35 U.S.C. 154(b) by 0 days.

(21) Appl. No.: 17/704,755

(22) Filed: Mar. 25, 2022

(65) Prior Publication Data

US 2022/0306173 A1    Sep. 29, 2022

Related U.S. Application Data

(60) Provisional application No. 63/166,741, filed on Mar. 26, 2021.

(51) Int. Cl.
| | |
|---|---|
| *B62B 3/10* | (2006.01) |
| *E04D 13/076* | (2006.01) |
| *B62B 5/00* | (2006.01) |

(52) U.S. Cl.
CPC .............. *B62B 3/10* (2013.01); *B62B 5/0033* (2013.01); *E04D 13/0765* (2013.01); *B62B 2202/50* (2013.01)

(58) Field of Classification Search
CPC . A47I 11/4016; A47I 11/4022; A47I 11/4027; A47I 11/4061; A47I 11/4066; A47I 11/4083; A47I 11/4005; B62B 3/10; B62B 5/0033; B62B 2202/50; E04D 13/0765
See application file for complete search history.

(56) References Cited

U.S. PATENT DOCUMENTS

| 4,380,844 A * | 4/1983 | Waldhauser ........ A47L 11/4075 15/349 |
| 4,723,971 A * | 2/1988 | Caldas .................... A47L 5/365 55/357 |
| 5,848,521 A * | 12/1998 | Kobayashi ............. A01G 20/47 56/13.2 |
| 2007/0294854 A1* | 12/2007 | Klucznik ............ A47L 11/4072 15/322 |
| 2015/0000070 A1* | 1/2015 | Liu ........................ A47L 9/0027 15/330 |

FOREIGN PATENT DOCUMENTS

| DE | 102011083319 | * | 3/2013 |
| FR | 2671746 | * | 7/1992 |

* cited by examiner

*Primary Examiner* — David Redding
(74) *Attorney, Agent, or Firm* — Donald R. Boys; Central Coast Patent Agency, LLC

(57) ABSTRACT

A cleaning and maintenance cart has a frame with a base on wheels, a handle arrangement connected at a lower end to the base and having control input mechanisms at an upper end configured to control elements of the cleaning and maintenance cart, a vacuum plenum coupled to a blower, a power plant coupled to and driving the blower, a collection container coupled to the plenum, the collection container having an internal filter, and a collection hose coupled to the collection container trough a removable lid. With the blower running a partial vacuum is produced in the plenum and in the collection container, and the collection hose is movable to collect dirt and debris that is confined to the collection container by the internal filter in the collection container.

9 Claims, 3 Drawing Sheets

MOBILIZED MAINTENANCE UTILITY CART

CROSS-REFERENCE TO RELATED DOCUMENTS

The instant application claims priority to provisional patent application 63/166,741 filed Mar. 26, 2021. All disclosure of the parent application is incorporated herein at least by reference.

BACKGROUND OF THE INVENTION

1. Field Of The Invention

The present invention is in the technical field of exterior cleaning and repair including maintenance and pertains more particularly to a system, apparatus and methods of housing, storing, organizing and transporting tools, equipment, materials, cleaning chemicals, and utilities for exterior cleaning and maintenance.

2. Description Of Related Art

In the field of exterior cleaning maintenance, a variety of apparatuses, tools and utilities may be used. The most common utilities are water and electricity to run equipment such as vacuums blowers, chemical pumps and pressure washers. In most cases when performing exterior maintenance, it is necessary to move over considerable distance with long cords and hoses to connect apparatus and utilities.

Finding and connecting to utilities in the field can be a big challenge, and often utilities are just not available. Another problem with exterior cleaning and maintenance is that apparatus and accessories may be distributed from storage and scattered around a site, leaving an operator with a task of cleaning up and organizing. Yet another problem with exterior cleaning and maintenance is ability to reach into places in need of cleaning. Often ladders are necessary which can be very heavy, awkward and dangerous, making these chores nearly impossible especially for older and handicapped people.

In some cases a wheelbarrow may be used for transporting apparatus and tools around a site, leaving the user with tasks of gathering, organizing and distributing to storage leaving the user exhausted. What is clearly needed is a mobilized industrial maintenance utility cart system.

BRIEF SUMMARY OF THE INVENTION

In one embodiment of the invention a cleaning and maintenance cart is provided, comprising a frame with a base on wheels, a handle arrangement connected at a lower end to the base and having control input mechanisms at an upper end configured to control elements of the cleaning and maintenance cart, a vacuum plenum coupled to a blower, a power plant coupled to and driving the blower, a collection container coupled to the plenum, the collection container having an internal filter, and a collection hose coupled to the collection container trough a removable lid. The cart is characterized in that, with the blower running a partial vacuum is produced in the plenum and in the collection container, and the collection hose is movable to collect dirt and debris that is confined to the collection container by the internal filter in the collection container.

In one embodiment the cleaning and maintenance cart further comprises a rigid conduit with a curved upper end, the rigid conduit connectable to the collection hose, enabling a user to hold the rigid conduit on a ground level with the curved upper end in a rain gutter with the blower running, cleaning debris from the rain gutter. Also, in one embodiment the cart further comprises an alternator driven by the power plant providing alternating current to a plurality of outlets to power electrical tools and apparatus. In one embodiment the power plant is a gasoline engine. And in one embodiment the power plant is an electric motor, the cleaning and maintenance cart further comprising a rechargeable battery of substantial capacity capable of driving the electric motor for an extended period.

In one embodiment of the invention the collection container is removable from the cart and has a removable lid. Also, in one embodiment the cart further comprises drive components whereby the cleaning and maintenance cart is self-propelled, the drive components powered by the power plant. Also, in one embodiment the control input mechanisms are configured to start and stop the cart, and to control translation speed of the cart. In one embodiment the collection container has a valved output and is isolated from the vacuum plenum and filled with water or a cleaning fluid, further comprising a liquid pump adapted to pressurize the water or cleaning fluid in the collection container, such that a hose coupled to the valved output is usable to spray the water or cleaning fluid on surfaces in a cleaning procedure. And in one embodiment the cart further comprises a pressure washer with a high-pressure liquid pump, wherein the valved outlet of the collection container provides the water or cleaning fluid to the pressure washer and the pressure washer is used to clean surfaces with high pressure water or cleaning fluid.

DETAILED DESCRIPTION OF THE INVENTION

The Inventor in various embodiments provides a unique mobilized industrial maintenance cart to be used as an aid for carting, organizing, housing and storing. The unique apparatus incorporates and delivers equipment, tools, cleaning chemicals, utilities and materiel to places in need of cleaning and repair. The present invention is described in enabling detail in the following examples which may represent more than one embodiment of the present invention.

Figure 1:
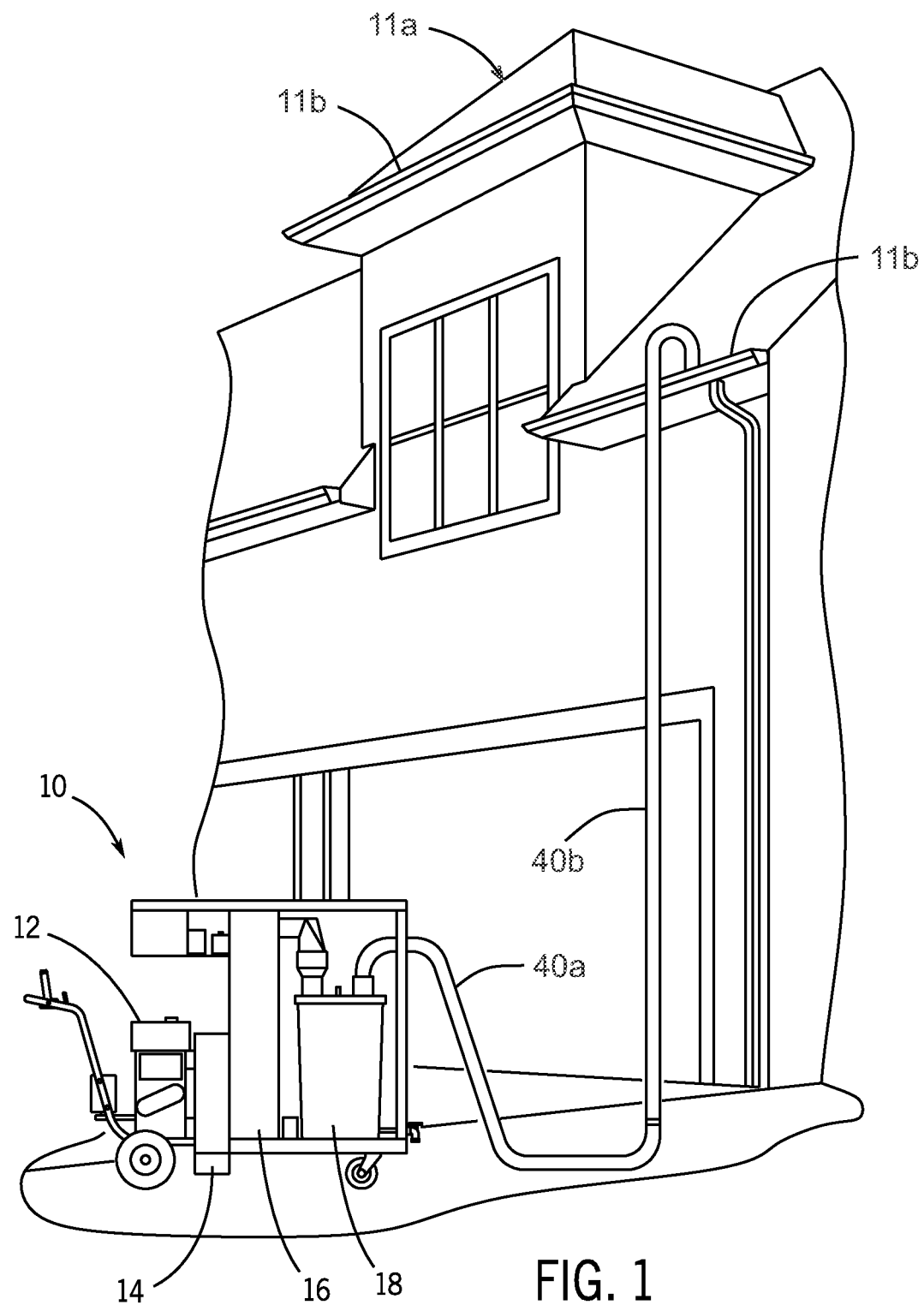
FIG. 1 is a perspective view of a residence and a utility cart according to an embodiment of the invention in use to clean rain gutters.

FIG. 1 is a perspective view of an exterior of a residence 11a with a utility cart 10 according to an embodiment of the invention, in use. In this example residence 11a has roof gutters 11b, windows, and siding that may be in need of cleaning and maintenance.

Utility cart 10 is a walk-behind mobile apparatus that may, in one embodiment, be self-propelled. In this example the cart and various elements are powered by a power plant 12. In alternative embodiments the power plant may be a gasoline or diesel engine, or may be an electric motor and the cart may further comprise a suitable rechargeable battery.

The cart in this example comprises a plenum 16 constructed of thin but strong, airtight material that can withstand a buildup of internal pressure or vacuum. A blower 14 driven by power plant 12 in one embodiment draws air from plenum 16 creating a strong partial vacuum. The material of the plenum in one embodiment is reinforced steel. In this example plenum 14 has an intake opening on the back side near the bottom of the plenum that matches an intake opening from the blower. At an opposite side near the top of the plenum is another intake opening that connects to other elements as described further below.

Figure 2:
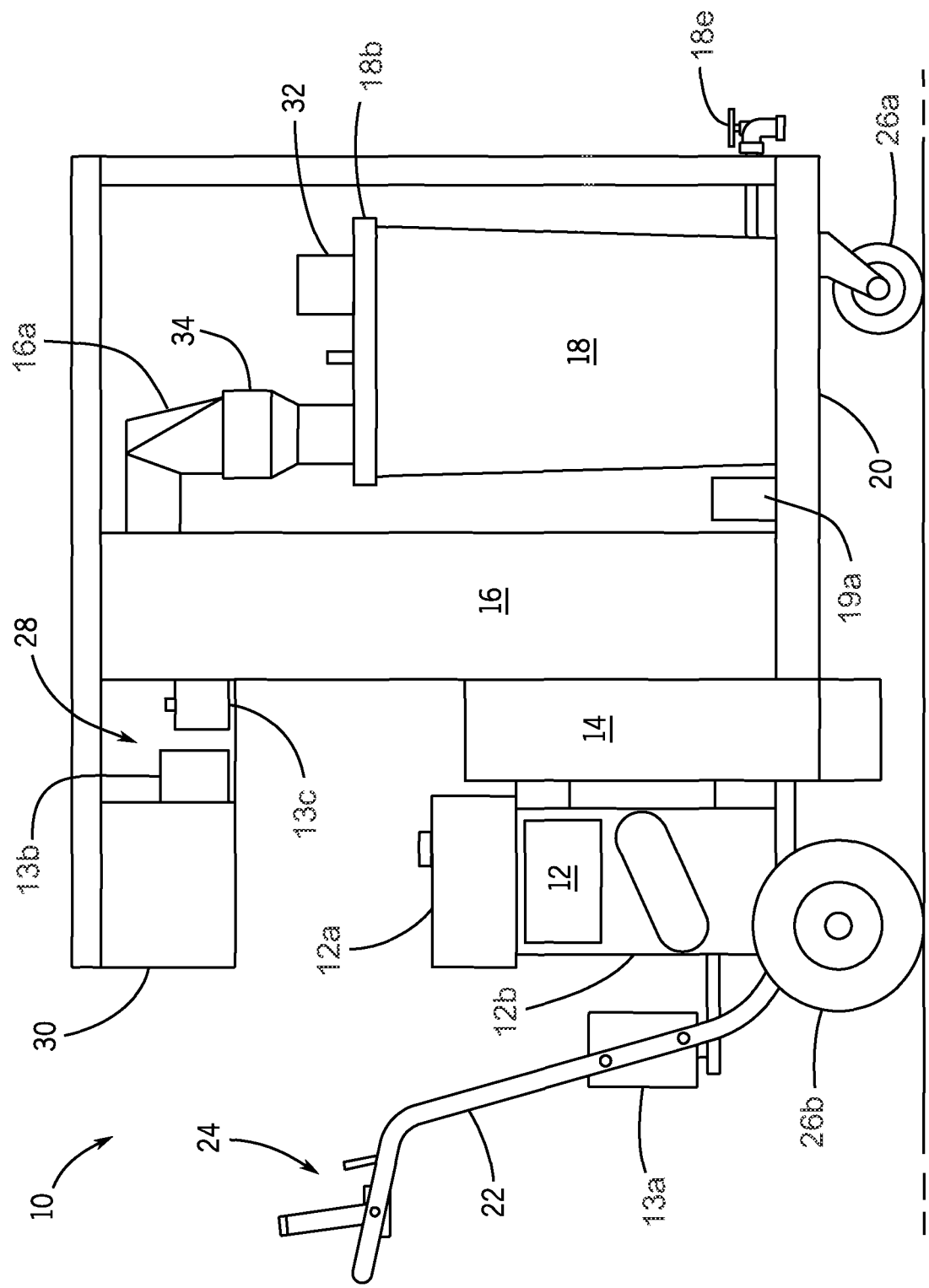
FIG. 2 is a side elevation view of a utility cart in one embodiment of the invention.

Referring now to FIG. 2, the opening at the top of the plenum in this example is coupled to a catch container 18 by conduit 16a and connector 34 through lid 18b, which is a removable lid sealed on the catch container. In this example catch container 18 may function as a wet vac collection container. There is a vacuum inlet opening 32 through the lid that may be connected to vacuum hose and tubes, such as hose 40a and tube 40b as shown in FIG. 1. Hose 40a and tube 40b are used, connected to vacuum container 18 I this example to vacuum debris from residence gutters 11b. In such an operation a user may grasp tube 40b and move a curved upper end along the gutter. Cart 10 may be moved as well as needed to reach all the residence gutters.

In one embodiment tube 40b may have sections such that the tube may be lengthened and shortened. Reconfigured tubes may be used to vacuum debris from flower beds, chicken coops, garage floors, and any other place that loose dirt and debris may need to be removed. Container 18 in some embodiments has a filter 18c that prevents dirt and debris from being carried into the plenum and hence to the blower. As mentioned above container 18 may also operate as a wet vac so water and other liquids may also be ingested in cleaning operations. bib drain 18e may serve to drain water collected in container 18.

In this example lid 18b is removable, and may be removed to be emptied, and to clean and to service container 18.

Cart 10 may comprise a frame 20 including a base having front wheels 26a and rear wheels 26b. A handle arrangement 22 connects at a lower end to the cart base and comprises controls 24 at an upper end, which may be configured to control the movement of the cart in an embodiment wherein the cart is self-propelled, and which may also start and stop the blower, and provide for speed control of the blower.

In one embodiment catch container 18 is mounted to base 20 in such a way that, with conduits, etc., removed, the container may be removed from the cart and serviced or may be replaced. Frame 20 also provides an overhead storage 28 which includes a tool box 30 where a user may store and carry tools. Although not explicitly shown in the figures, the frame of the cart has hanging hooks down both sides in one embodiment, where a user may hang larger tools and devices that may be useful in cleaning and maintenance operations. An AC inverter 13a and a DC battery 13c are also housed in this region. There is an alternator 13a that is operated by the power plant and provided AC power for electrical elements of the cart. The alternator provides power for a series of outlets on the frame that may be used to plug in and power electric accessory apparatus.

In one embodiment there may be a winch electrically powered. There is also in one embodiment a chemical pump 19a. In one embodiment a user may close container 18 from plenum 16 and may fill the container with a solution for cleaning or other purpose. In this embodiment chemical pump 19a may be used to partially pressurize container 18, and a hose and perhaps conduit as well may be coupled to an outlet 18e, with a valve, such that the cleaning fluid in container 18 may be directed onto siding, windows and other surfaces that need to be cleaned.

In another embodiment there may be a separate pressure washer that may be supplied with fluid through outlet 18e from container 18, and the nozzle of the pressure washer may be used to clean siding and other surfaces that may require higher pressure than may be provided by pump 19a.

Figure 3:
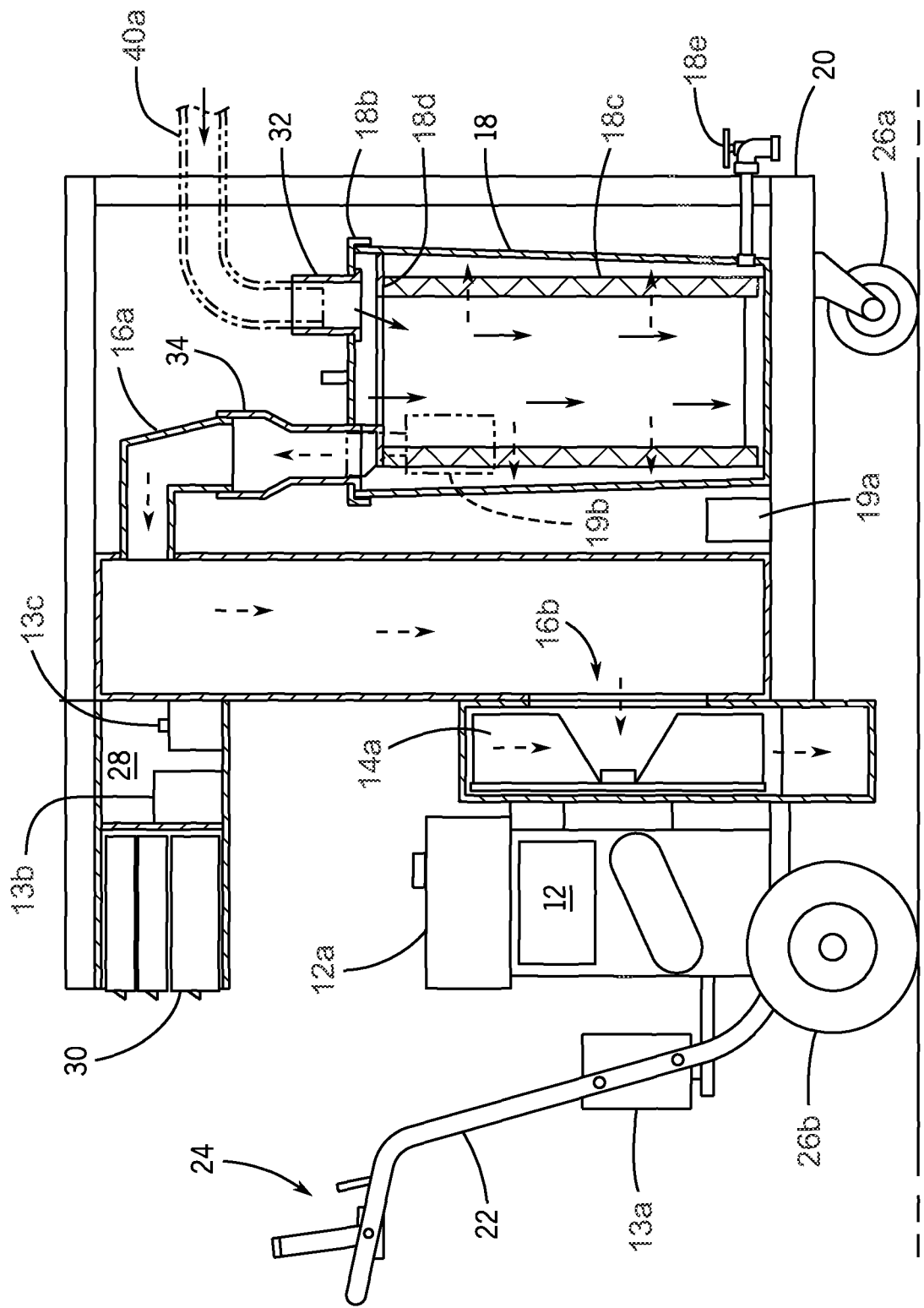
FIG. 3 is a partial cross-section view of the cart of FIG. 2 in an embodiment of the invention.

FIG. 3 is a side elevation view of the cart in an embodiment of the invention with some elements sectioned to show additional detail not apparent in FIGS. 1 and 2. A gas tank 12a is shown for the embodiment that uses a gasoline engine. Impeller 14a is indicated for blower 14. Opening 16b from the plenum into the blower is indicated. Container 18 is shown sectioned to illustrate a filter 18c that is removable and replaceable and a chemical filter 19b is shown as well.

Cart 10 in embodiments of the invention provides electrical outlets and powers peripheral electrical tools and devices need in cleaning and maintenance, and also provides water and/or cleaning solutions, as well as a method for using same in cleaning operations. The cart serves in some circumstances as a dry vacuum, in other circumstances as a wet vacuum, and in other circumstances as a source of cleaning fluid or water in cleaning operations.

A person of ordinary skill will understand that the embodiments described above are entirely exemplary, and are not limiting to the scope of the invention, which is limited only by the claims.

The invention claimed is:

1. A cleaning and maintenance cart, comprising:
   a frame with a base on wheels;
   a handle arrangement connected at a lower end to the base and having control input mechanisms at an upper end configured to control elements of the cleaning and maintenance cart;
   a vacuum plenum coupled to a blower;
   a power plant coupled to and driving the blower;
   a collection container coupled to the plenum, the collection container having an internal filter;
   a collection hose coupled to the collection container through a removable lid;
   a valved output coupled to the collection chamber; and
   a liquid pump coupled to the collection chamber;
   characterized in that, with the blower running a partial vacuum is produced in the plenum and in the collection container, and the collection hose is movable to collect dirt and debris that is confined to the collection container by the internal filter in the collection container, and in that with the collection container isolated from the vacuum plenum and filled with liquid, and with the liquid pump running, a hose coupled to the valved output is usable to spray the liquid on surfaces in a cleaning procedure.

2. The cleaning and maintenance cart of claim 1 further comprising a rigid conduit with a curved upper end, the rigid conduit connectable to the collection hose, enabling a user to hold the rigid conduit on a ground level with the curved upper end in a rain gutter with the blower running, cleaning debris from the rain gutter.

3. The cleaning and maintenance cart of claim 1 further comprising an alternator driven by the power plant providing alternating current to a plurality of outlets to power electrical tools and apparatus.

4. The cleaning and maintenance cart of claim 1 wherein the power plant is a gasoline engine.

5. The cleaning and maintenance cart of claim 1 wherein the power plant is an electric motor, the cleaning and maintenance cart further comprising a rechargeable battery of substantial capacity capable of driving the electric motor for an extended period.

6. The cleaning and maintenance cart of claim 1 wherein the collection container is removable from the cart and has a removable lid.

7. The cleaning and maintenance cart of claim 1 further comprising drive components whereby the cleaning and maintenance cart is self-propelled, the drive components powered by the power plant.

8. The cleaning and maintenance cart of claim 7 wherein the control input mechanisms are configured to start and stop the cart, and to control translation speed of the cart.

9. The cleaning and maintenance cart of claim 1 further comprising a pressure washer with a high-pressure liquid pump, wherein the valved outlet of the collection container provides the liquid to the pressure washer and the pressure washer is used to clean surfaces with the high pressure liquid.

\* \* \* \* \*